United States Patent [19]

Jodoin et al.

[11] Patent Number: 5,471,320
[45] Date of Patent: Nov. 28, 1995

[54] STACK FILTERS FOR 1-TO-N BIT IMAGE PROCESSING IN ELECTRONIC PRINTERS

[75] Inventors: Ronald E. Jodoin, Pittsford; Robert P. Loce; R. Victor Klassen, both of Webster; Ying-Wei Lin, Penfield, all of N.Y.

[73] Assignee: Xerox Corporation, Stamford, Conn.

[21] Appl. No.: 241,432

[22] Filed: May 11, 1994

[51] Int. Cl.$^6$ ............................ H04N 1/40; H04N 1/407; G06T 5/00
[52] U.S. Cl. ........................ 358/455; 358/466; 382/260; 382/270
[58] Field of Search .................................. 358/455, 456, 358/458, 448, 465, 466, 451, 299; 382/260, 264, 270, 272

[56] References Cited

U.S. PATENT DOCUMENTS

| | | | |
|---|---|---|---|
| 4,709,274 | 11/1987 | Tanioka | 358/455 |
| 5,083,210 | 1/1992 | Reilly et al. | 350/455 |
| 5,134,668 | 7/1992 | Appel | 358/455 |
| 5,270,836 | 12/1993 | Kang | 358/459 |
| 5,282,057 | 1/1994 | Mailloux et al. | 358/445 |
| 5,301,037 | 4/1994 | Kang et al. | 358/451 |

OTHER PUBLICATIONS

Loce and Dougherty, "The Mean-Absolute-Error Theorem for Computational Morphology," Proc. SPIE, vol. 2030, San Diego, Jul. 1993.

Wendt, Coyle and Gallagher, "Stack Filters," IEEE ASSP-34, No. 4, pp. 898–911, 1986.

Lin and Coyle, "Stack Filters and the MAE Criterion," IEEE ASSP-36, No. 8, pp. 1244–1254, 1988.

Lin and Coyle, "Minimum MAE Estimation over the Class of Generalized Stack Filters," IEEE ASSP-38, No. 4, pp. 663–678, 1990.

E. Dougherty and D. Sinha, "Computational Mathematical Morphology," University Laboratory Report MIL-92-17, Morphological Imaging Laboratory, Center for Imaging Science, Rochester Institute of Technology.

*Primary Examiner*—Scott A. Rogers
*Attorney, Agent, or Firm*—Duane Basch

[57] ABSTRACT

The present invention is a method and apparatus for the enhancement of 1 bit per pixel image signals to produce a multiple-bit per pixel form. A binary input image is passed through a plurality of filters to generate level slices. The filters are stack filters implemented as look-up table or template-based filters, morphological filters, or any similar binary-to-binary filters that could be used to generate level slices. Each of the N−1 filters is used to produce the slices, where N is the number of possible gray-scale levels desired in the output image. Once the slices are generated, the resulting binary image data therein is recombined, by adding or stacking, to produce the desired multiple-bit per pixel output.

30 Claims, 10 Drawing Sheets

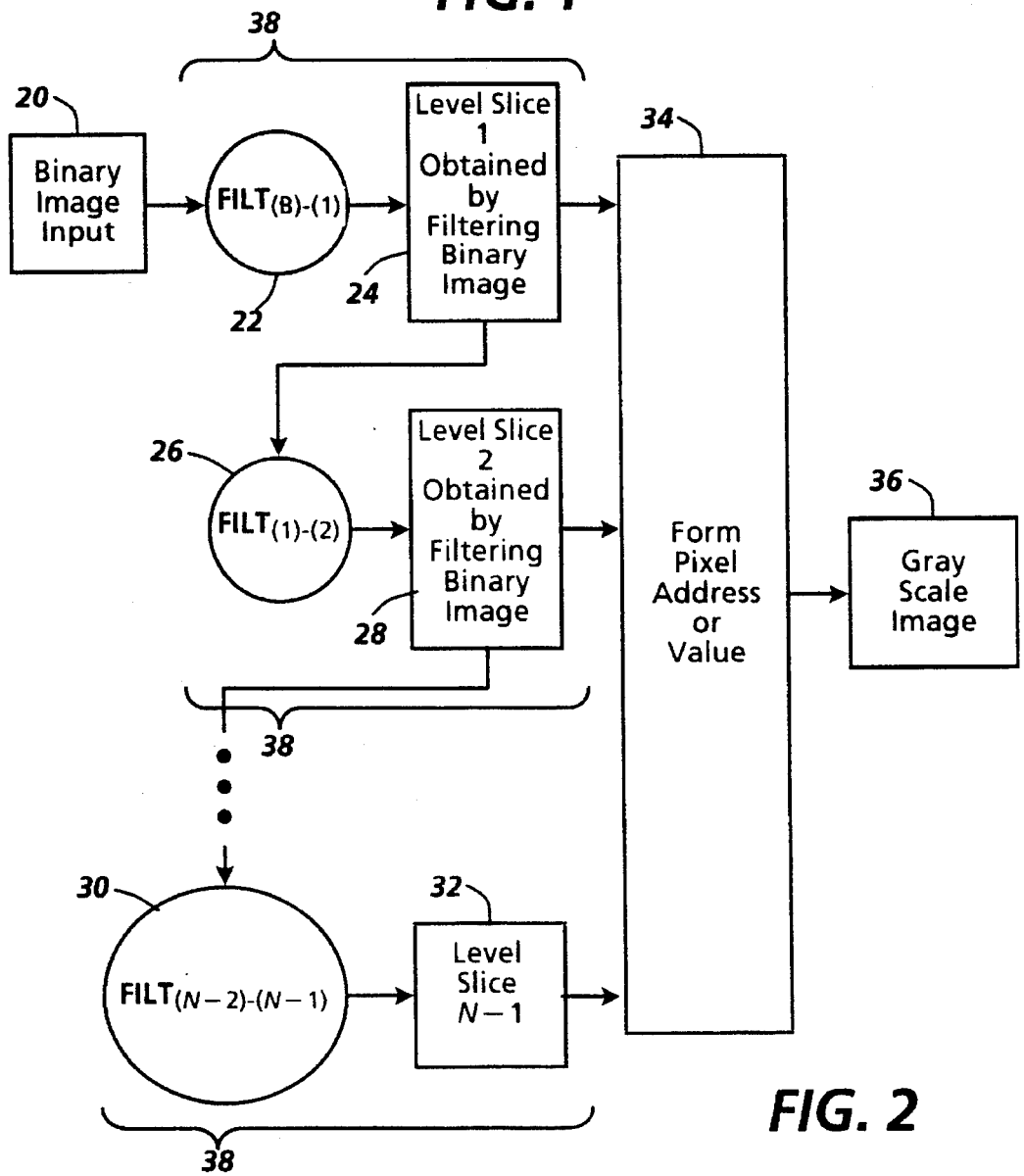

STACK FILTERS FOR 1-TO-N BIT IMAGE PROCESSING IN ELECTRONIC PRINTERS

This invention relates generally to a method and apparatus for producing a 1-to-N bit per pixel enhancement of a binary bitmap image, and more particularly to the use of template-matching stack filters to produce such enhancements for electronic printing.

BACKGROUND AND SUMMARY OF THE INVENTION

The present invention focuses on image processing of binary images to enable such images to be printed or otherwise displayed at an enhanced pixel resolution. It is known in the art of digital printing that it is highly desirable to print low resolution documents in an enhanced mode. Moreover, template-based binary resolution enhancement and conversion has been addressed by others such as R. Eschbach application Ser. No. 08/169,483, H. Kang U.S. Pat. No. 5,270,836, issued Dec. 14, 1993 and U.S. Pat. No. 5,301,037, issued Apr. 5, 1994, and L. Mailloux U.S. Pat. No. 5,282,057, issued Jan. 25, 1994, all of which are hereby incorporated by reference. The present invention differs from that body of work in that it is a method and apparatus directed to converting a binary image to a multiple-bit-per-pixel image while maintaining the same spatial resolution.

More closely related is the work of Banton and Charissis, in a co-pending application Ser. No. 08/241,431 filed concurrently herewith and Loce and Cianciosi in application Ser. No. 08/169,485, where binary bit maps are converted to an enhanced multibit form. Banton and Charissis focus on gray imaging of halfbits and ragged features by employing a single:set of templates within a 9×9 window. A match in their scheme yields an output that describes how the pixel should be imaged. Several matches with different templates could occur at the same location, and when that occurs, the resulting output is decided in an arbitration circuit. Moreover, the set of templates were designed manually over a long period of time. Loce and Cianciosi proposed using a statistically generated set of templates that transformed from a binary bit map to an array of pulse-width position-modulated (PWPM) codes, where each code was that one most often observed for a given input pattern in a statistical training process.

In short, image processing in electronic printing is often called upon to take a binary bit map as input and transform it to a gray-scale image. For example, scanned documents are typically digitized at 8 bits/pixel and then thresholded to 1 bit/pixel. Converting from 1 to 2 bits per pixel for enhancement purposes is a filtering operation that estimates what the image would have been had it been converted from this 8 bit representation, or some idealized 8 bit representation, to 2 bits instead of 8 bits to 1 bit. "Descreening" a halftoned image is a 1-to-N bit filtering operation that yields an estimate of the gray-scale image prior to halftoning, or an estimate of that gray-scale image quantized in a particular manner.

Heretofore, related publications have discussed 1-to-N bit enhancement using morphological filters. For instance Loce and Dougherty, in "The Mean-Absolute-Error Theorem for Computational Morphology," Proc, SPIE, Vol. 2030, San Diego, July 1993, describe passing an input binary image through parallel morphological filters, where the output of each filter is a "gray level slice" of the total output. The output slices are then stacked to form the final multibit/pixel image. The design method requires the filters for each layer to be designed simultaneously and therefore is very complex in a combinatoric sense. Because of the extensive computation involved in evaluating the combinatorics, the filters given in the publication are limited to operate within a 5 pixel window.

Stack filters in general are described by Wendt, Coyle and Gallagher "Stack Filters," IEEE ASSP-34, no. 4, pp. 898–911 , 1986, and optimization of stack filters are described by Lin and Coyle, "Stack Filters and the MAE Criterion," IEEE ASSP-36, no. 8, pp. 1244–1254, 1988. In their optimization scheme, to simplify the design process, the same filter is applied to all slices. However, this simplification renders the method ineffective for binary to gray enhancement. In another publication by Lin and Coyle, "Minimum MAE Estimation over the Class of Generalized Stack Filters," IEEE ASSP-38, no. 4, pp. 663–678, 1990, they state that they have not been able to develop an overall filter that properly stacks when each layer utilizes a different filter. Note that stack filters are typically used for filtering gray-scale images, and, other than the related computation morphology work cited above, are not believed to have been described for binary to gray scale transformation. Also note that the stacking architecture allows for certain cost savings in the electronics.

Also of interest is the publication "Computational Mathematical Morphology," by E. Dougherty and D. Sinha, University Laboratory Report MIL-92-17, Morphological Imaging Laboratory, Center for Imaging Science, Rochester Institute of Technology. This report proposes a general mathematical framework for performing a parallel/adding filtering from an arbitrary number of gray levels to another arbitrary number of gray levels, although the filter design and implementation method are not given. Also, the relationship given to combine the output of the parallel filtering does not necessarily ensure the "no gap" criterion for stacking. Furthermore, while a design method is given in the reference by Loce and Dougherty, it suffers from the described combinatoric complexity.

The present invention is directed to a new method for designing an apparatus for implementing 1-to-N bit stack filters, where the design of the filters for the individual level slices of the stack is sufficiently independent that the combinatoric complexity is greatly reduced, thereby enabling filters to be designed that employ much larger windows. For example, using this method, it is possible to design filters that employ 32 pixel windows, which pack simply into a single unsigned long integer representation on many computing platforms. When properly designed, an optimal stack filter with this large window greatly outperforms, in an output image quality sense, the small window filters described by Loce and Dougherty, in "The Mean-Absolute-Error Theorem for Computational Morphology," Proc. SPIE, Vol. 2030, San Diego, July 1993.

In accordance with the present invention, there is provided a method of transforming a plurality of rasterized binary signals indicative of a binary input image into a multiple-bit-per-pixel gray-scale image, comprising the steps of: (a) receiving the plurality of rasterized binary signals; (b) filtering the rasterized binary signals to produce a binary level slice from each one of a plurality of level slice filters; and (c) combining the binary level slices to produce the multiple-bit-per-pixel gray-scale image.

In accordance with another aspect of the present invention, there is provided a method for transforming a binary input image B(x,y), represented as a plurality of rasterized binary signals, into a multiple-bit-per-pixel gray-scale image comprising the steps of: (a) storing the binary input image $B(x,y)$ in a first memory $M(x,y)$; (b) filtering the binary image stored in the first memory $M(x,y)$ to produce a filtered binary image $F_1(x,y)$; (c) storing the filtered binary input image $F_1(x,y)$ in the first memory $M(x,y)$; (d) filtering the binary image stored in the first memory $M(x,y)$ to produce a new filtered binary image $F_n(x,y)$; and (e) stacking filtered binary image $F_1(x,y)$ and new filtered binary image $F_n(x,y)$ to produce a gray-scale output image $O(x,y)$, wherein each of a plurality of pixels therein is represented as a two-bit value.

In accordance with yet another aspect of the present invention, there is provided a method for transforming a binary input image $B(x,y)$ into a multiple-bit per-pixel gray-scale image comprising the steps of: (a) storing the binary input image $B(x,y)$ in a first memory $M(x,y)$; (b) filtering the binary image stored in the first memory $M(x,y)$ to produce a filtered binary image $F_1(x,y)$; (c)storing the filtered binary input image $F_1(x,y)$ in the first memory $M(x,y)$; (d) filtering the binary image stored in the first memory $M(x,y)$ to produce a new filtered binary image $F_n(x,y)$; (e) stacking filtered binary image $F_1(x,y)$ and new filtered binary image $F_n(x,y)$ to produce interim image $I(x,y)$, and storing the interim image in a second memory; (f) storing the new filtered binary input image $F_n(x,y)$ in the first memory $M(x,y)$; (g) filtering the binary image stored in the first memory $M(x,y)$ to produce a new filtered binary image $F_n(x,y)$; (h) stacking interim image $I(x,y)$ and new filtered binary image $F_n(x,y)$ to produce a new interim image $I(x,y)$, and storing the interim image in a second memory; and (i) repeating steps (f)through (h) above for a plurality of times to produce a gray-scale output image $O(x,y)$, wherein each of a plurality of pixels therein is represented as a multiple-bit value.

In accordance with a further aspect of the present invention, there is provided a digital image filtering apparatus, comprising: a first memory for storing a binary input image; a first level slice filter to which the stored binary image may be applied, said first level slice filter producing a primary binary signal in response to each pixel of the binary image applied thereto to produce a first-slice filter output; combination logic for logically combining the first-slice filter output and the binary input image to produce an output image first-slice; a second level slice filter to which the output image first slice may be applied, said second level slice filter producing a secondary binary signal in response to each pixel of the output image first slice applied thereto to produce a second-slice filter output; combination logic for logically combining the second-slice filter output and the first output image slice to produce a second output image slice; and stacking logic for logically stacking the second image slice and the first image slice to produce a filtered image that is a multiple-bit per pixel image representing each of a plurality of binary pixels within the binary input image as a two-bit value.

In accordance with another aspect of the present invention, there is provided a digital image filtering apparatus for transforming a binary input image represented as a plurality of rasterized binary signals each representing an image pixel, into a multiple-bit per pixel gray scale image, comprising: a primary level-slice filter for filtering the binary input image to produce a first filtered binary image; a first secondary level-slice filter for filtering the first filtered binary image to produce a second filtered binary image; a second secondary level-slice filter for filtering the first filtered binary image to produce a third filtered binary image; and an adder for adding the first filtered binary image, the second filtered binary image, and the third filtered binary image to produce a gray-scale output image, wherein each of a plurality of pixels therein is represented as a multiple-bit value.

In accordance with an aspect of the present invention, there is provided a digital image filtering apparatus, comprising: a first memory for storing a binary input image; an extensive level-slice filter to which the stored binary image may be applied, said first level-slice filter producing a first binary signal in response to each pixel of the stored binary image applied thereto to produce a first level slice image; an anti-extensive level-slice filter to which the stored binary image may be applied, said second level-slice filter producing a second binary signal in response to each pixel of the stored binary image applied thereto to produce a second level slice image; and stacking logic for logically stacking the second image slice and the first image slice to produce a filtered image that is a multiple-bit per pixel image representing each of a plurality of binary pixels within the binary input image as a two-bit value.

In accordance with a further aspect of the present invention, there is provided a digital image filtering apparatus for transforming a binary input image represented as a plurality of rasterized binary signals, each representing an image pixel, into a multiple-bit per pixel gray scale image, comprising: a first level-slice filter to which the binary input image may be applied, said first level-slice filter producing a first binary signal in response to each pixel of the binary image applied thereto to produce a first image slice; a second level-slice filter to which the binary input image may be applied, said second level-slice filter producing a secondary binary signal in response to each pixel of the binary image applied thereto to produce a second image slice; and an adder for adding the second image slice and the first image slice to produce a filtered image that is a multiple-bit per pixel image representing each of a plurality of pixels within the input image as a multiple-bit value.

In accordance with yet another aspect of the present invention, there is provided a method for designing a stack filter, for enhancing a binary input image into a multiple-bit-per-pixel image, comprising the steps of: (a) obtaining an idealized gray-scale image, wherein the image contains structures representative of those likely to appear in documents to be enhanced from binary to a multiple-bit per pixel gray-scale range; (b) thresholding the gray-scale image using a binary threshold level to produce a binary image; (c) thresholding the gray-scale image at a second threshold, preferably not equal to the binary threshold, to produce a first level slice; (d) producing, as a function of the binary pixel levels in the binary image and the first level slice, a first :difference image; and (e) generating, as a function of the first difference image and the binary image, a first level slice filter having a plurality of templates that, upon receiving binary input signals within windowed subsets of pixel locations within the binary image will produce binary output signals equivalent to pixels at corresponding pixel positions in the first difference image.

BRIEF DESCRIPTION OF THE DRAWINGS

FIG. 1 is an example of a stack representation of an image signal in one dimension;

FIG. 2 is a schematic block diagram of a general embodiment for an iteration-based stack filter that achieves the 1-to-N bit resolution enhancement in accordance with the present invention;

Figure 3:
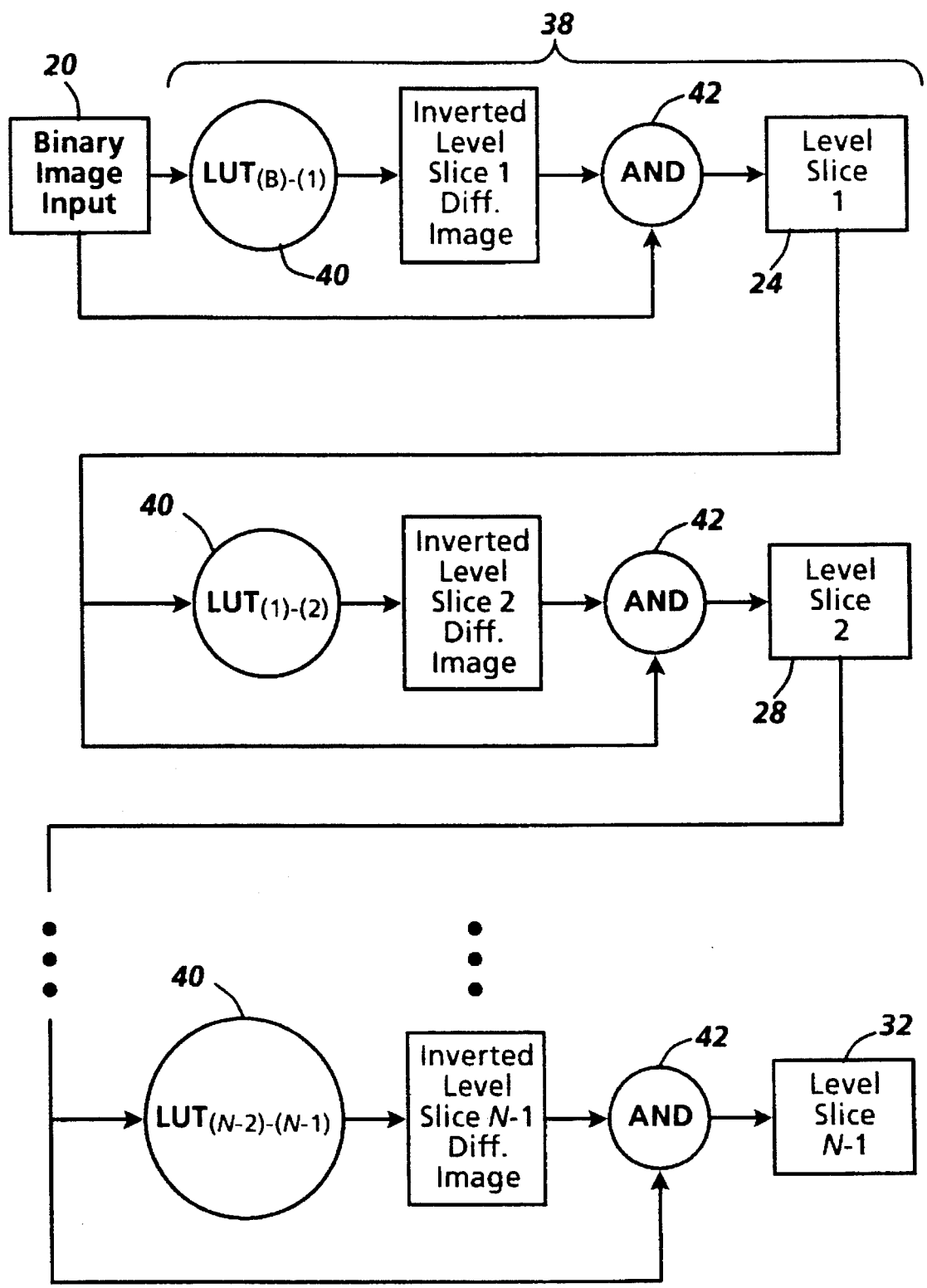
FIGS. 3 and 4 schematically illustrate two alternatives to the general embodiment of FIG. 2.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the various aspects of the present invention, reference is made to the drawings. In the drawings, like reference numerals have been used throughout to designate identical elements. The present invention is directed to methods and apparatus for designing and implementing 1-to-N bit image enhancement filters. The design method includes computer-aided design of template-based stack filters that generate gray-level slices of an output image.

FIG. 1 shows an example stack representation of an image signal in one dimension. Generally, the gray-scale input signal is decomposed, using threshold decomposition, into binary slices, represented in the figure as level slices 1, 2, and 3. The gray-scale signal of the example illustrated is limited to 4 possible levels: 0, 1, 2, 3. The individual level slices add or stack to form the various signal levels of the gray-scale image. For any pixel, the 1's in the slices start from the lowest slice (level slice 1 as depicted in FIG. 1) and extend to the slice that corresponds to the value of the gray-scale pixel. That is, a given column gives the unary representation of the value. Note that Level slice 2 is a subset of Level slice 1, and that no gaps (e.g., 1-0-1) in a column of pixels are allowed to occur. This method of signal decomposition is known in the field of image processing and leads to simplifications in the supporting mathematics and in the implementation electronics, where N−1 binary level slices levels may be used to represent N gray-scale levels.

As used herein, a filter is said to be anti-extensive if the output is always a subset of the input. On the other hand, the filter is extensive if the output is always a superset of the input. The level-slice stack filters that form a portion of the present invention are designed to be either extensive or anti-extensive.

A generalized embodiment for an iteration-based stack filter that achieves the 1-to-N bit resolution enhancement of the present invention is illustrated in FIG. 2. The binary input image 20 is first passed through a first filter 22 to generate the first level slice 24. Binary input 20 may be any image represented as a plurality of rasterized binary signals, the sources of which include, but are not limited to, scanned or digitized documents and computer generated bitmaps. Regardless of the source, binary image 20 may be stored in and/or retrieved from memory. The stack filters described herein may be look-up table filters, morphological filters, or any similar combination of binary-to-binary filters that could be used to generate the level slices, The output of each filter, the level slice, is itself a plurality of binary signals forming a binary image. The level slices each represent a prediction of the binary image that would have resulted from thresholding the continuous tone document image (if it was available) that was binarized to achieve the binary image. Included in continuous-tone images are idealized multiple bit-per-pixel forms of the image that could be constructed or obtained through one of several possible methods. As an example, the idealized gray-scale image may be obtained by averaging down a high addressability binary form of an image and the ORing the averaged image with a morphological-like skeleton as black.

The notation $FILT_{(x)-(y)}$, as used in FIG. 1, denotes the filtering of binary image x to obtain binary image y. As a result of processing by the first filter, first level slice 24 is produced, representing what is predicted to be the equivalent level slice for a gray-scale image from that the binary input image was derived. Subsequently, the first level slice is passed through a second filter 26 to generate second level slice 28 in sequence. Moreover, as illustrated in FIG. 2, the process is repeated N−1 times, where $FILT_{(N-2)-(N-1)}$ 30 yields slice 32, where N is the number of possible gray-scale levels desired in the output image. When the first filtering is for the lowest slice then the following filters must be anti-extensive so the level slices diminish for higher slices, and therefore will properly stack. Conversely, when starting at the top level, the following filters must be extensive so the levels become broader for lower levels. Upon producing the level slices for each of the N−1 levels, binary signals for corresponding pixels within the individual levels are stacked at address block 34 to form a value or address for that pixel. When recombined in a rasterized fashion, the plurality of pixel values or addresses output from address block 34 produce an N-bit gray-scale output image 36.

As illustrated in FIG. 2, each stage 38 of the stack filter would require a buffer with memory for as many scanlines as the height of its filter window. Hence the initial pipeline delay is the sum of the delays of the individual stages, where the delay is the result of time required to establish context for the filters, but the throughput is the same as that of the slowest stage rather than that of the sum of the stages. It is also noted that in an alternative embodiment, the implementation of the stack filter can be fully or partially parallelized using an architecture similar to that depicted in FIG. 2. However, a non-pipelined architecture would require storing the entire image bitmap between stages. The buffers of the pipelined embodiment typically require less total memory.

Within the individual filter stages are binary operators, such as morphological filters, template-matching filters, or other logic-based filters. These binary filters are independent to the degree that they can be designed one at a time instead of simultaneously, as described herein. Therefore the individual filters can be reasonably complex, using at least 32-pixel templates or windows, as opposed to the 5-pixel templates described by Loce and Dougherty, "The Mean-Absolute-Error Theorem for Computational Morphology," Proc. SPIE, Vol. 2030, San Diego, July 1993. Filtering the output of a previously applied filter tends to lower the accuracy of the results as compared to a simultaneously designed filter, however, this is overcome by the large gain in accuracy that results from the increased window size.

Figure 4:
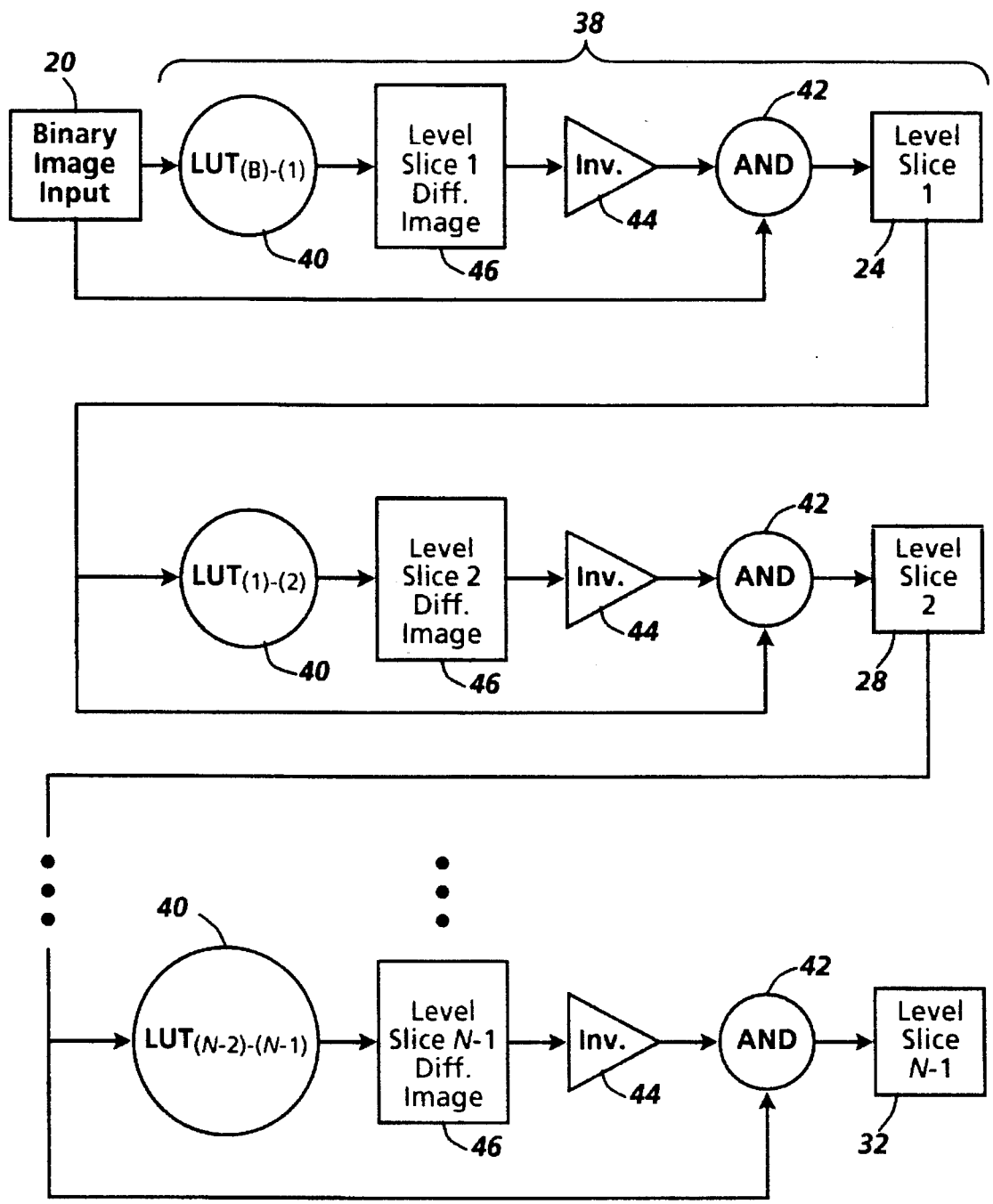

FIGS. 3 and. 4 illustrate two alternatives to the generalized embodiment of FIG. 2, where anti-extensive filters consist of template-matching stages implemented using look-up tables (LUT's) 40 coupled with logical AND's 42 and INVERT's 44. More specifically, FIG. 3 employs look-up tables 40 that generate an INVERT of the difference image 46 between the two given levels. The inversion, coupled with the AND ensures that the levels properly stack. By performing, in effect, a set subtraction filtering, Level 2 is a subset of Level 1, etc., and the sequence of operations for a given level forms an anti-extensive filter. FIG. 4 is an alternative LUT filtering embodiment for obtaining gray level slices. This embodiment is useful whenever the difference between levels is relatively small. In such situations, a trade-off can be made and a small LUT can perform the task, because it only needs to identify difference pixels. The resulting incremental "cost" is the additional INVERT operation. Note that other combinations of logical operations coupled with look-up-table-type filters can be made to be extensive or anti-extensive. The preferred embodiment for a particular application is largely dependent upon the available computing architecture.

Figure 5:
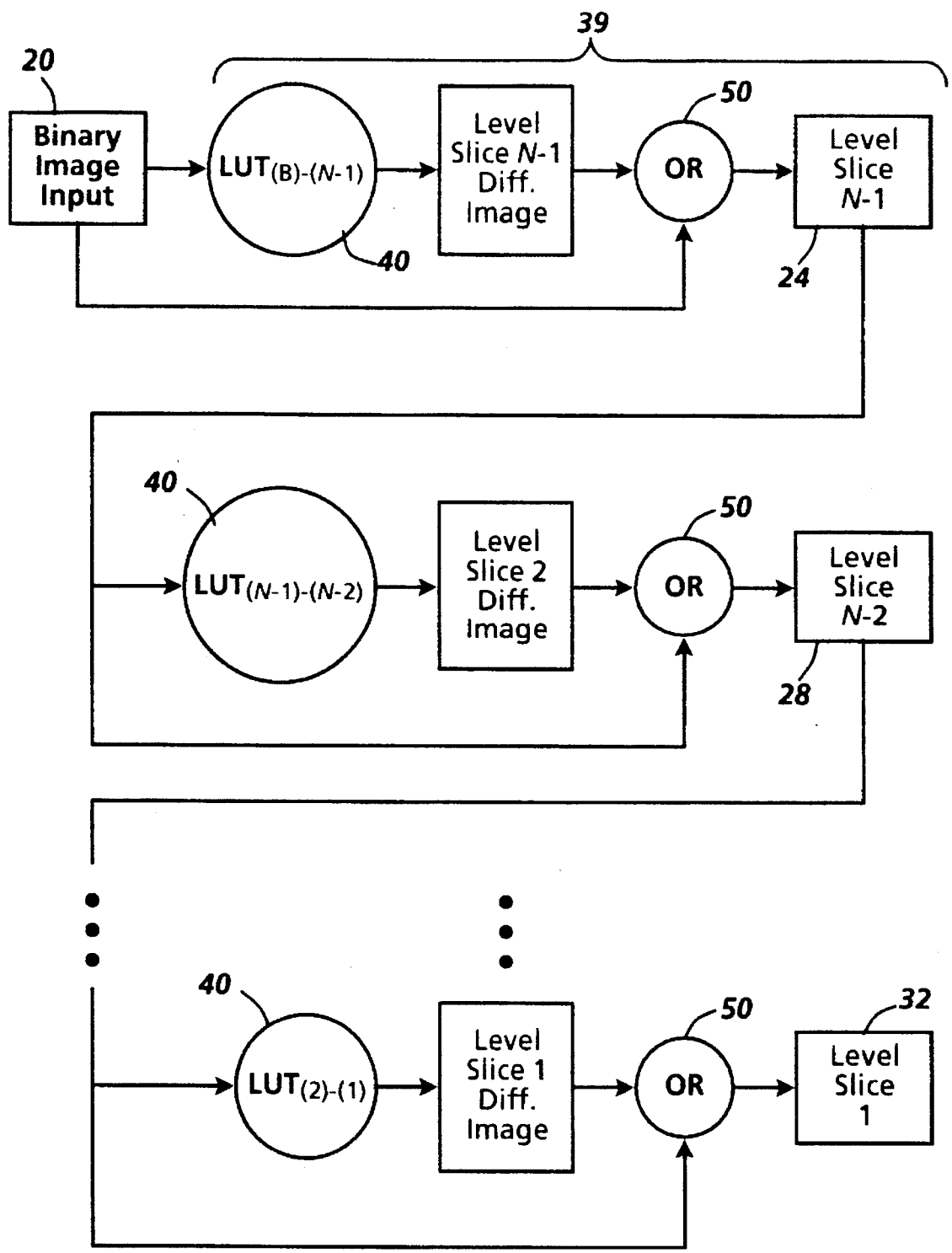
FIG. 5 illustrates an extensive filter embodiment of the generalized architecture depicted in FIG. 2.

Similarly, FIG. 5 illustrates an extensive filter embodiment of the generalized architecture depicted in FIG. 2. Like the embodiments of FIGS. 3 and 4, the LUT 40 is used to generate the gray level slices at each extensive filtering stage 39. More specifically, the LUT's generate the difference image between the two given levels, for example, between the binary input image and Level slice N−1. OR operation 50 ensures that the levels properly stack; by performing, in effect, set union filtering, where Level N−2 is a superset of Level N−1, etc., so that the sequence of operations for a given layer form an extensive filter.

When employing template-matching filters, the look-up table of templates may consist of many fewer entries when the templates are chosen to only identify pixels that are to be changed, as opposed to identifying all pixels that should be a binary 1 or 0 in the output. That is why the difference images are generated by the filter. Moreover, morphological filters could be used instead of template matching. These variants to the illustrated embodiments can also be pipelined, reducing total memory requirements, and in a hardware implementation, improve total throughput.

Figure 6:
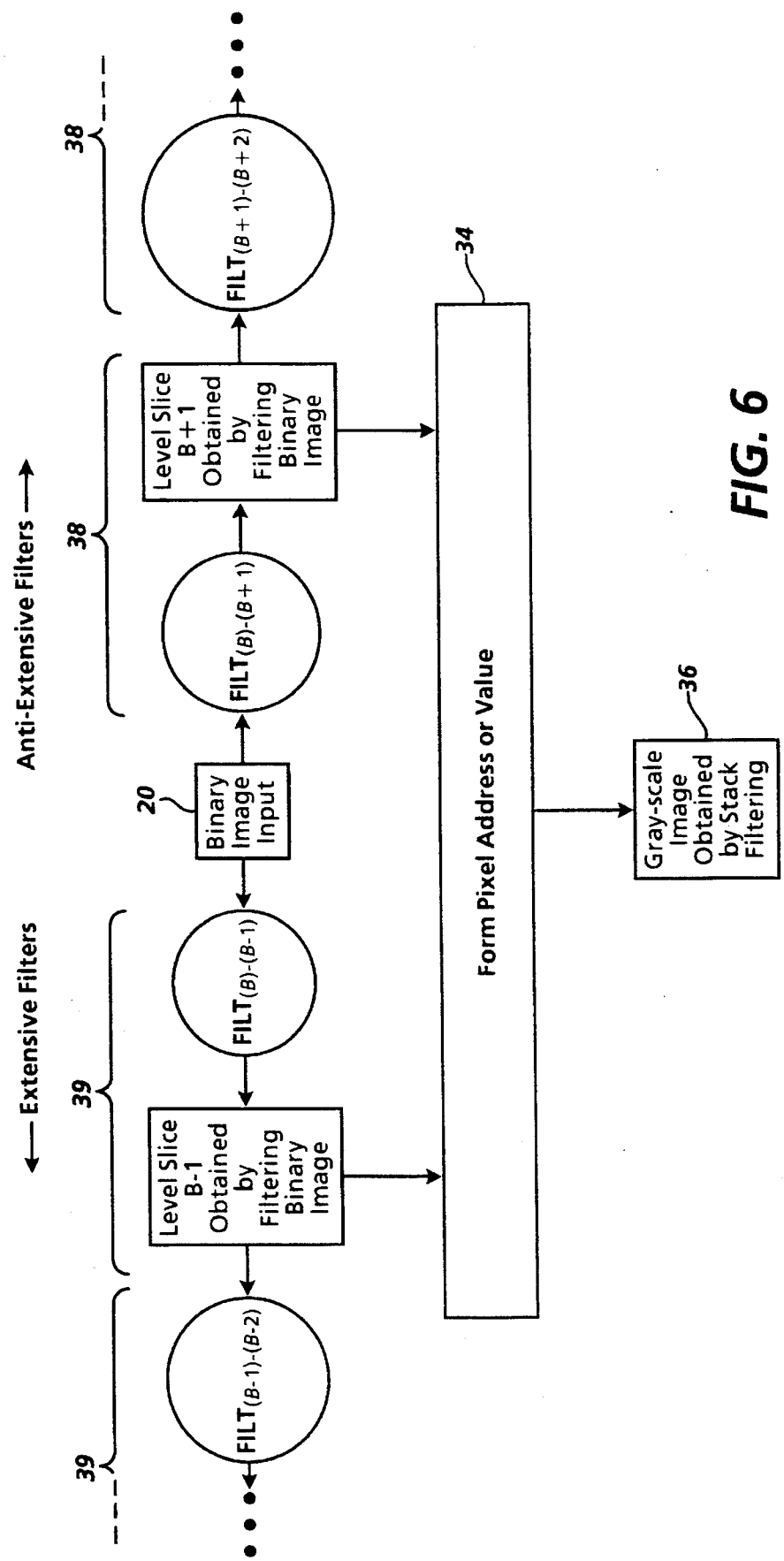
FIG. 6 illustrates a preferred method of performing iteration-based stack filtering in accordance with the present invention.

Turning next to FIG. 6, where a preferred method of performing iteration-based stack filtering is illustrated, the binary image 20 may be filtered by one or more extensive filter stages 39, or anti-extensive filter stages 38. As described above, the level slices from the various filter stages are combined by address block 34 to produce gray-scale image 36. The embodiment shown in FIG. 6 is preferred because extensive filters are used to generate slices that are broader than the input binary image and anti-extensive filters are used to generate slices that are diminishing. This embodiment allows for fewer estimation steps for any given slice, thus increasing performance in both accuracy and speed. Furthermore, the single pipeline embodiment previously discussed is split into two parts, reducing the pipeline latency (time for the first pixel out), while steady state throughput is unchanged. From the itera-tive-stack architecture shown here, we can see that thee stack filtering paradigm is a natural setting for binary to gray-scale conversion. Each filter employed in the process is a binary, or logical, operator. This leads to design and implementation simplification over arithmetic averaging and other related schemes. Employing iteration in the filter architecture has reduced the combinatoric complexity encountered by Loce and Dougherty, allowing filters with larger windows to be designed by the present invention.

Figure 7:
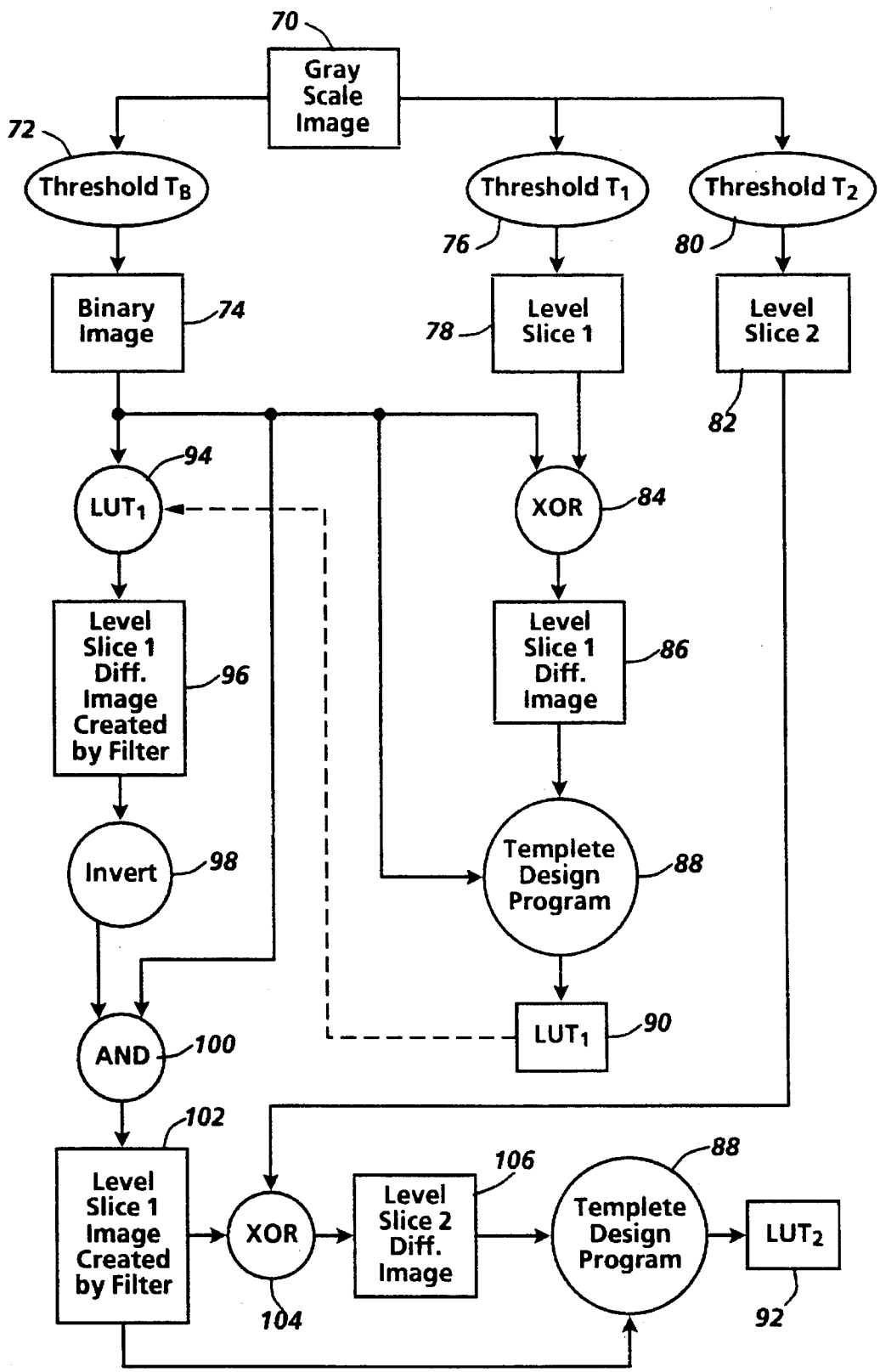
FIG. 7 shows a flowchart for a design procedure that may be used to generate the stack filters of FIG. 4.

Each of the individual filters is designed using training sets of images and the statistical principles as described in "Method for Statistical Generation of Density Preserving Templates for Print Enhancement," R. Loce, application Ser. No. 08/169,565, filed Dec. 17, 1993, and "Automated Template Design Method for Print Enhancement," R. Eschbach, application Ser. No. 08/169,483, both of which are hereby incorporated by reference for their teachings. An example of the design procedure for two slices of the filter of FIG. 4 is shown in FIG. 7. The filter design process starts with an ideal gray-scale image 70, for example, one that could be obtained from a page description language (PDL) such as PostScript™ (Adobe)input by generating a high addressability binary image and then scaling to normal resolution and multibit pixels. The gray image is then thresholded at step 72 to a level $T_B$, generating a binary image 74 that is statistically similar to the binary images that are expected to be encountered in operation of the stack filter. Thresholding is also performed at steps 76 and 80 to generate the desired level slices 78 and 82, respectively, using thresholds $T_1$ and $T_2$, where $T_B < T_1 <_{T2}$. The template set for Level 1 is obtained by first generating a difference image using XOR operation 84 to produce difference image 86, and then the difference image and the original binary image are input to a template-design program 88 similar to that disclosed by R. Eschbach in application Ser. No. 08/169,483, previously incorporated herein by reference. The output of the template design program is a set of templates, represented in FIG. 7 as $LUT_1$ 90, that can filter a binary image to generate a difference image for Level slice 1 and have a minimum number of pixels in error.

A second look-up table of templates, $LUT_2$, indicated by reference numeral 92, is designed by applying the first look-up table, $LUT_1$ to the binary image at step 94. The difference image 96 of this filter-obtained slice 1, and slice 2 obtained by applying threshold $T_2$, are used in the template design program to generate $LUT_2$. Specifically, difference image 96 is inverted, step 98, and then ANDed with binary image 74, step 100, to produce the Level slice 1 filtered image, 102. That image is then XORed with the Level slice 2 image generated using threshold $T_2$, at step 104, to produce the difference image 106. As before, difference image 106 and Level slice 1 filtered image 102 are input to a second instance of template-design program 88. Using the second instance of template design program 88, the second look-up table of templates, 92, is designed. Subsequent look-up tables, $LUT_n$, could be generated using a similar process.

The above-described method for creating the training set may be considered an orthographic technique because of the PDL source of the images. Training sets may also be created for the reprographic setting by, for example, using scanned images where initial quantization is to 8 bits and appropriate thresholding follows.

Considering performance, it has been demonstrated that the filter embodiments described can perform well when transforming text from 1 to 2 bits per pixel for output enhancement purposes. It is further believed that this iteration-based filter will perform well when there are small differences between level slices and when the difference pixels occur in structured areas. Also, in practice, the filter would likely be limited to generating a few bits per pixel because of potential estimation errors that can occur when using filtered output as the input to the other filtering stages; as described with respect to FIG. 7.

Figure 8:
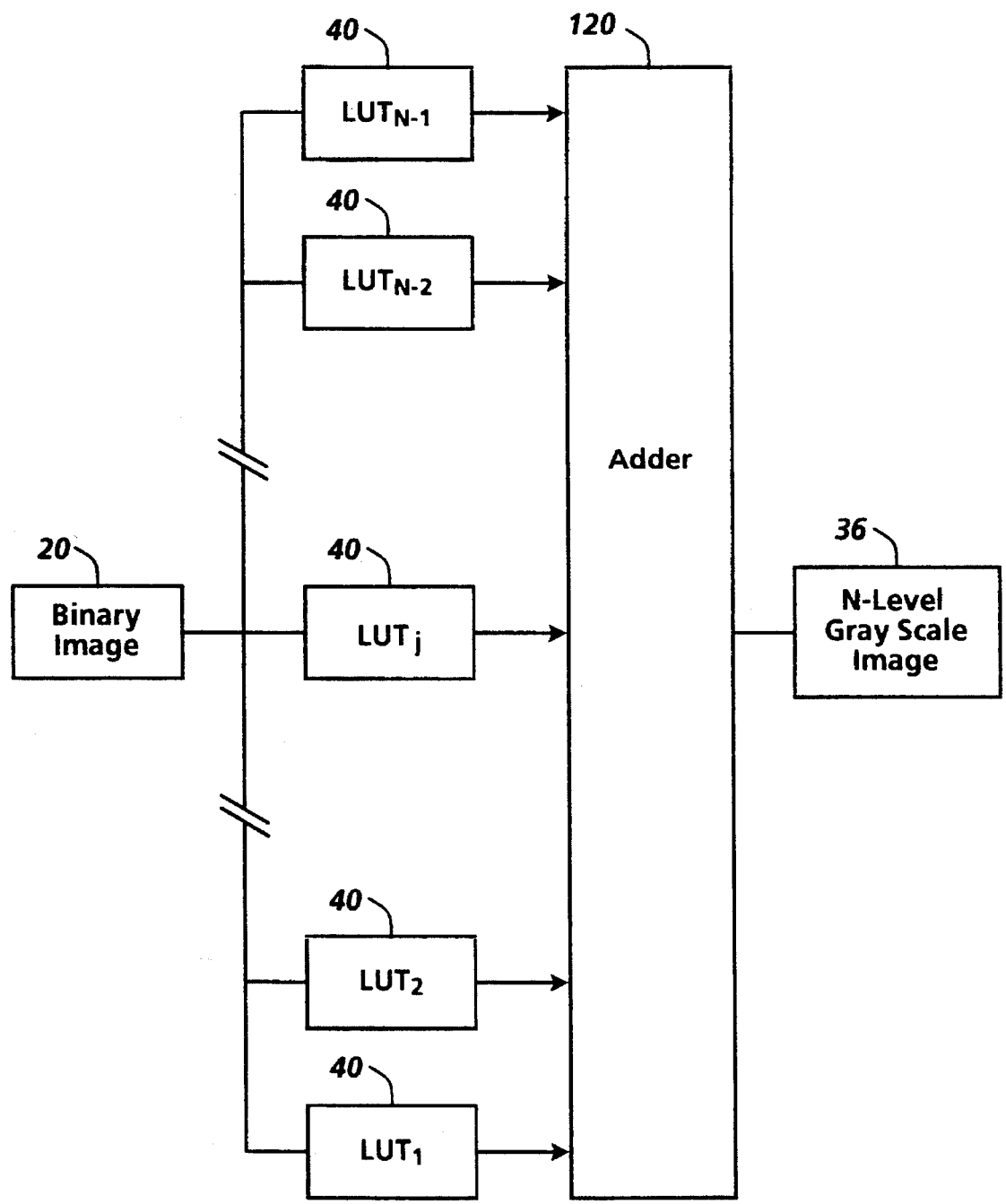
FIG. 8 illustrates an alternative embodiment of the stack filter that employs a parallel architecture to achieve a 1-to-N bit resolution enhancement.

As previously described, the stack filters are constructed so that there are no "gaps" between the level slices. However, abandoning the no-gap criterion of "stacking" leads to an alternative electronic architecture, where parallel filters could operate directly on the binary image to produce slices that are subsequently added together. The trade-off is a more complex operation (add or max as opposed to stack) but a faster implementation (parallel instead of serial). As illustrated in FIG. 8, a plurality of parallel look-up tables 40, may be employed to provide input to an Adder 120, the output of which is the multi-level gray-scale image 36. An additional advantage here is that all filtering is performed directly on the binary input image and estimation errors will not compound as could happen in the iterative embodiment. Design of the "adding" filter or adder is straightforward; training is performed directly between the binary image and a given level slice. For most text and line art training sets likely to occur in practice, the parallel or adding version of FIG. 8 would provide images that stack according to the original criterion, however stacking can only be guaranteed for a restricted set of images.

A parallel version of the stack filter can be designed that does satisfy the "no gap" criterion. One method of achieving this is by employing a different type of iteration in the design process. If the anti-extensive aspect of the filter is first considered, design begins by generating a first anti-extensive filter by the methods described above. A second anti-extensive filter is then designed by the training method of FIG. 7, but in the present case all the templates that identify difference pixels for the first filtering must be present in the second filter. In this design stage more difference identifying templates are added to the previously designed filter. The filter design program then takes as input the filter for generating the level slice 1 image, the binary input image, and the ideal second level slice. The general rule for this particular design method is that filters for higher layers must contain the difference identifying templates of the layer below. For successive extensive filters, difference identifying templates are removed from the look-up tables. Thus, in the parallel embodiment of the iterative stack filter, the design process is performed iteratively in a manner that ensures proper stacking when applied in parallel.

Yet another version lies intermediate between the version of FIG. 7 and the fully parallel version, described previously and shown in FIG. 8. This is a tree-based version, in which a primary filter operates on level 50%, where the output thereof feeds at least two secondary filters. For example, a pair of filters that operate on levels 25% and 75%. Then the first of the secondary filters feeds two tertiary filters operating on levels 12.5% and 37.5%, and so on. Again there is no guarantee of stacking, but in practice it is expected to work for most training sets. Having an intermediate architecture, this filter has intermediate virtues in the way of minimizing compounding errors and stacking gap errors. A pipelined implementation of the tree-based version would have lower latency than the version of FIG. 7, and the same throughput as the fully parallel version of FIG. 8.

In the above-described method for designing and implementing 1-to-N bit image enhancement filters, computer-aided selection of a set of templates for each "gray level slice" of the output image is used. The templates for a given level slice identify pixels that are to be changed when transforming from the binary bit map to that level slice and the level slices are "stacked" to form the final image. The design and implementation schemes are general in that they can be used for a range of gray levels and template sizes. Several variations can be rapidly designed and adapted to the budget and performance needs of a given product configuration. This design method designs the filter for each slice in a somewhat independent manner, hence avoiding the computation limitation of the method of Loce and Dougherty, and enabling templates with at least 32 pixels.

Figure 9:
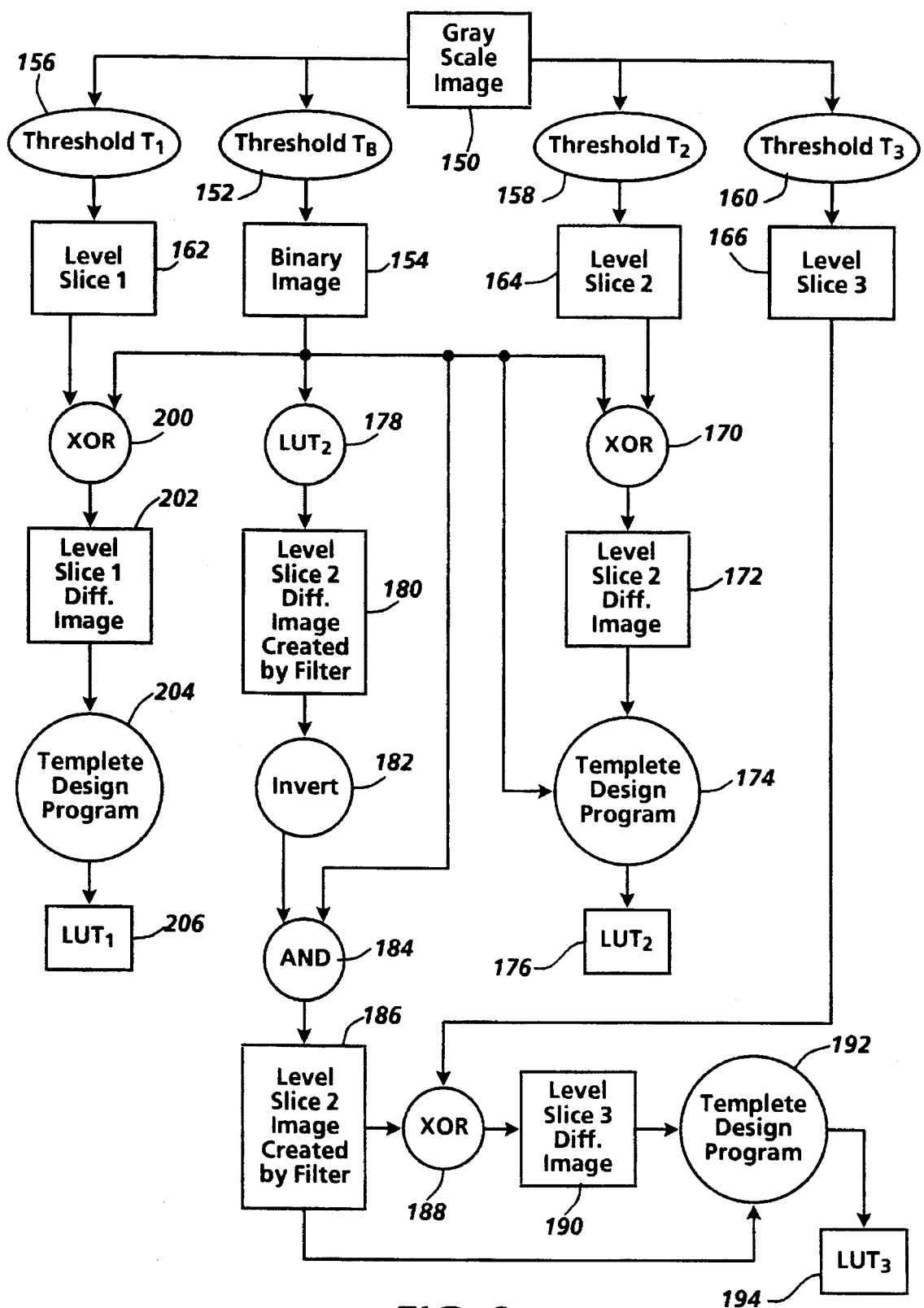
FIG. 9 shows an example flowchart of the filter design process for a 1-to-2-bit conversion filter produced in accordance with the present invention.

While the general design procedure for the template look-up tables (LUTs) has been described, an example of the filter design embodiment for a 1-to-2-bit conversion filter is shown in FIG. 9, where $T_1 < T_B < T_2 < T_3$. As described herein, the level stacking step operates such that pixels that have value 0 in all level slices are treated as white, pixels that have a 1 in only level slice 1 are treated as light gray, pixels that have 1's in only levels 1 and 2 are treated as dark gray, and pixels that have 1's in all slices are treated as black. Also, as with FIG. 7, operations or steps within the process are enclosed in circles or ellipses, objects are in boxes, and the output look-up tables are in shaded boxes.

More specifically, ideal gray-scale image 150 is then thresholded at step 152 using threshold level $T_B$, to generate binary image 154. Thresholding is also performed at steps 156, 158 and 160 to generate the desired level slices 162, 164 and 166, respectively, using thresholds $T_1$, $T_2$ and $T_3$. The template set for Level 2 is obtained by first generating a difference image using XOR operation 170 to produce Level slice 2 difference image 172, and then difference image 172 and binary image 154 are input to a template-design step 174, as previously described. The output of the template design step is a set of templates, represented in FIG. 9 as look-up table 176 (LUT$_2$), that can filter a binary image to generate a difference image for Level slice 1 and have a minimum number of pixels in error.

Using LUT$_2$, a second look-up table of templates, LUT$_3$, indicated by reference numeral 194, is designed by applying LUT$_2$ to the binary image at step 178. The Level 2 difference image 180 is then INVERTed at step 182 and then ANDed with binary image 154 at step 184 to produce the Level slice 2 filtered image, 186. Filtered image 186 is then XORed with the Level slice 3 image generated using threshold $T_3$, at step 188, to produce the Level slice 3 difference image 190. As before, difference image 190 and Level slice 2 filtered image 186 are input to a second instance of the template-design program, 192. During template design step 192, the LUT$_3$ templates, 194, are designed.

In a "parallel" process, threshold step 156 is used to generate Level slice 1 image 162, which is supplied as an input to be XORed with binary image 154 at step 200. The output of XOR step 200 is the Level slice 1 difference image 202. Subsequently difference image 202 and binary image 154 are inputs to a third instance of the template-design program, 204, the output of which are the templates forming LUT$_1$, indicated by reference numeral 206. In one design example the templates were restricted in size to a 5×5 window, and 2545, 2014, and 4750 templates were employed in LUT$_1$, LUT$_2$ and LUT$_3$, respectively. In practice, the number of templates in each look-up table could be reduced through logic minimization, symmetry analysis, and culling out templates that only marginally add to the enhancement capability based upon a statistical analysis. Note that these filters may be rapidly redesigned for a greater number of bits per pixel, larger window size, different image types, or possibly to treat halftones in some special manner.

Figure 10:
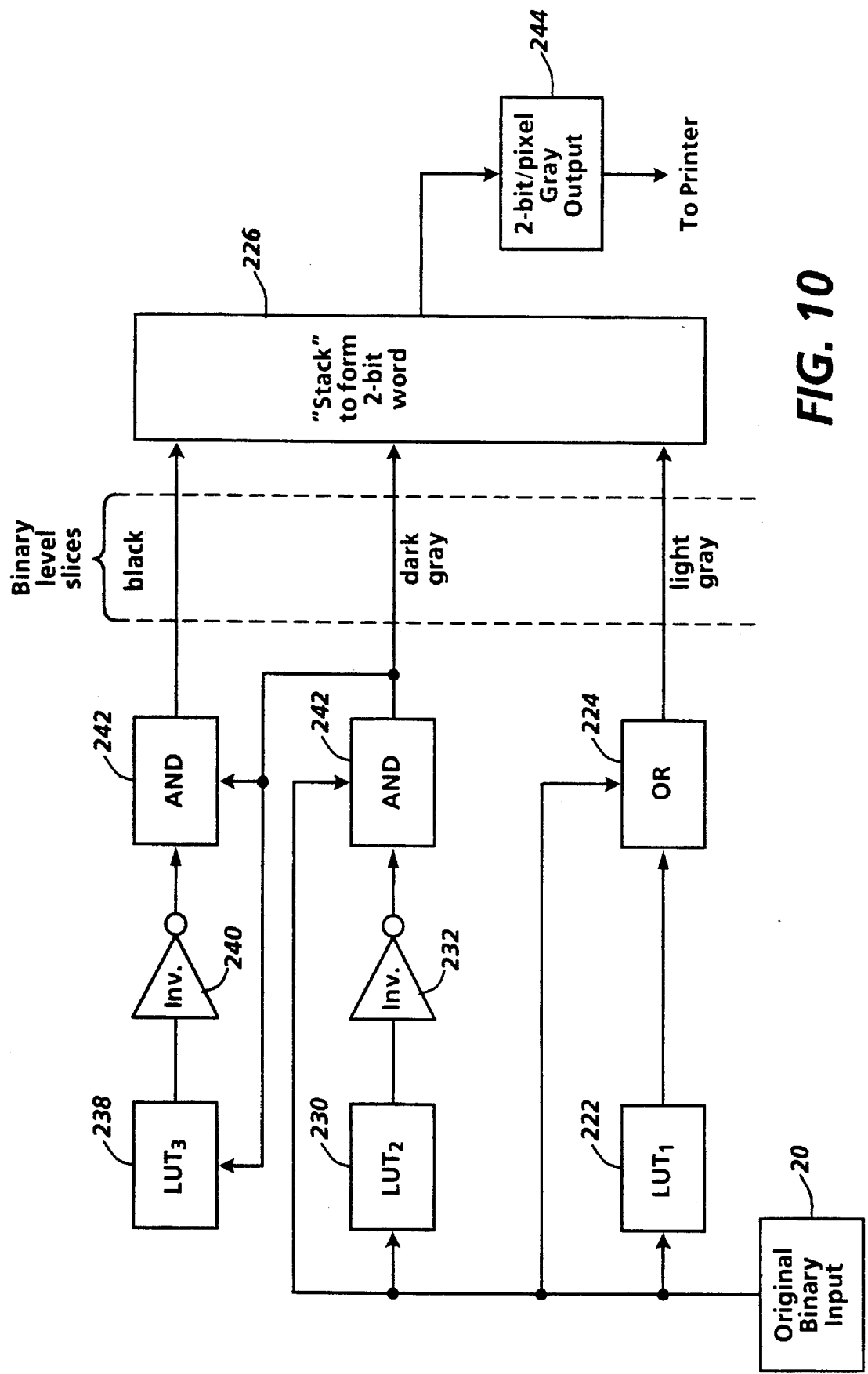
FIG. 10 is a block diagram illustrating a process for obtaining a 2-bit per pixel bit map using the filters designed by the process depicted in FIG. 9.

A method for obtaining a 2-bit per pixel bit map using the LUTs of FIG. 9 is shown in FIG. 10, Specifically, a light gray level slice is generated by feeding binary image 20 to a first look-up table, 222. The resulting Level slice 1 difference image is then ORed, block 224, with binary image 20 to produce the light gray level slice. The light gray level slice information is passed to stacking block 226, where it will be stacked with additional level slice data. The dark gray level slice is generated in a similar manner, where binary image 20 is input to a second look-up table, 230. Look-up table 230 in turn generates an inverted difference image that is passed to inverter 232 prior to being ANDed with the binary image at block 234. The resulting output from AND block 234 is passed to both stacking block 226 and to the input of the third look-up table 238. Operating on the dark gray image slice, 1ook-up table 238 generates an inverted difference image which is first inverted at block 240 and then ANDed with the dark gray image slice at block 242. The output of AND block 242 is also passed to stacking block 226. As inconsistencies may existing in the speed at which each leg of the stack filter operates, synchronization and/or temporary buffering of the binary level slice data within the stacking block is preferred.

When all binary level slice data is available for a particular pixel, the data is stacked to form a 2-bit word using a process that is essentially the reverse of that illustrated in FIG. 1. Table A summarizes the stacking operation carried out in block 226, where the binary signal for common

TABLE A

| Black Level Slice | Dark Gray Level Slice | Light Gray Level Slice | Gray Output (binary) |
|---|---|---|---|
| 0 | 0 | 0 | 00 |
| 0 | 0 | 1 | 01 |
| 0 | 1 | 1 | 10 |
| 1 | 1 | 1 | 11 | pixel positions are "stacked" to determine the resulting gray-scale output level shown in the right-most column and represented as output 244 in FIG. 10.

Figure 11:
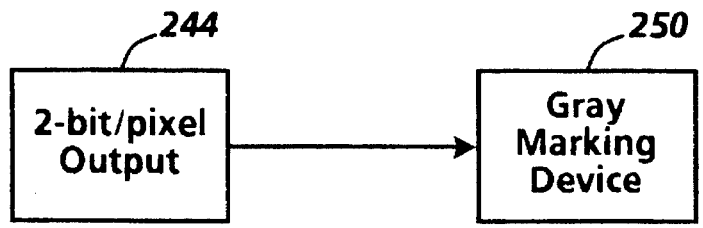
FIGS. 11 and 12 illustrate two alternative methods for printing the resulting 2-bit-per-pixel gray-scale bit map produced by the process depicted in FIG. 10.
Figure 12:
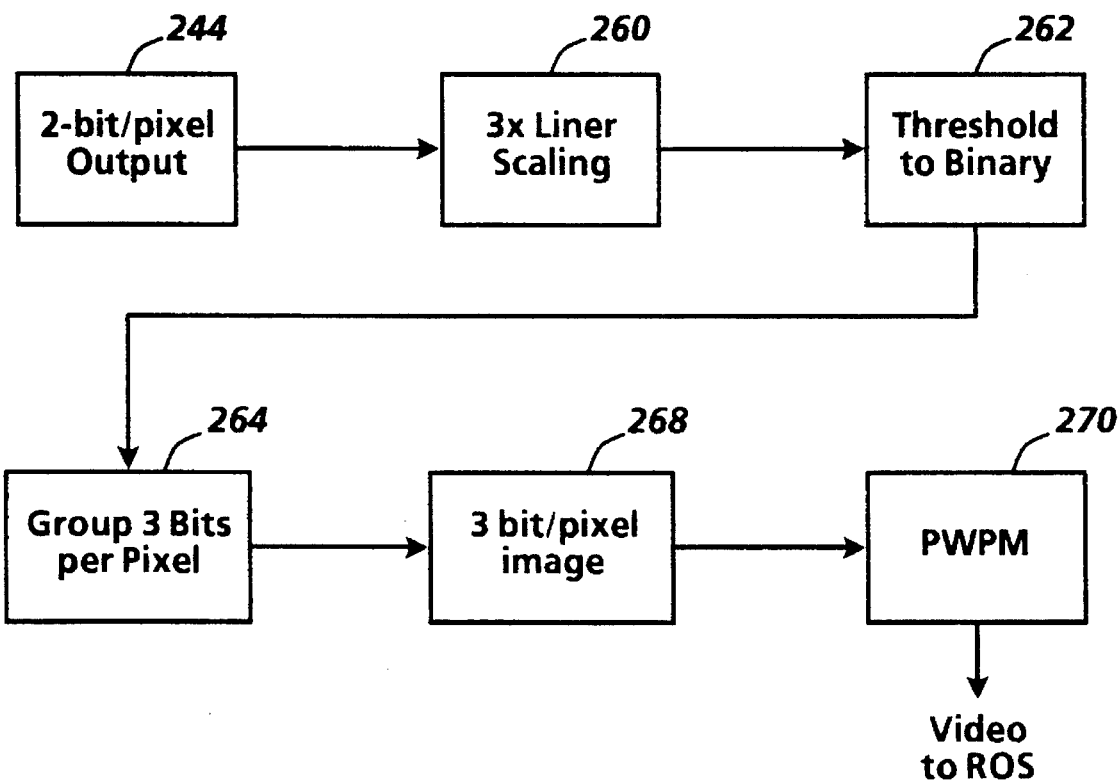

FIGS. 11 and 12 illustrate several methods for printing the resulting 2-bit per pixel gray-scale bit map. FIG. 11 is straightforward, but requires a 2-bit per pixel marking device 250. The method of FIG. 12 utilizes the same 2-bit per pixel gray-scale signals to drive a marking device, such as a raster output scanner (ROS) employing a laser, but employs further image processing functions to generate the video signals.

In the printing embodiment of FIG. 12 the 3×linear scaling at block 260 is performed only in the; fast scan direction of the bit map. Note that after the scaling and thresholding to binary, block 262, the image could be output using a printing apparatus having the capability for high addressability, for example, the apparatus described in U.S. patent application Ser. No. 08/118,858 (D/93197), filed Sep. 10, 1993, and hereby incorporated by reference for its teachings with respect to high addressability printing. Generally, the scaled and thresholded data would be grouped into serial strings of three bits, block 264, and the image represented as a series of 3-bit strings, image 268, would be used to drive the pulse-width position modulated (PWPM) apparatus 270 that produces the video signals to drive the raster output scanner.

In recapitulation, the present invention is a method and apparatus for the enhancement of 1-bit-per-pixel image signals to produce a multiple-bit-per-pixel form. Briefly, a binary input image is passed through a first filter to generate a first level slice. The level slice filters described herein are implemented as look-up table or template-based filters, morphological filters, or any similar binary-to-binary filters that could be used to generate the level slices. The output of each filter, the level slice, is itself a plurality of binary signals forming a binary image. The first level slice is then passed through a second filter to generate second level slice and the process may be repeated to produce N–1 slices, where N is the number of possible gray-scale levels desired in the output image. Once the slices are generated, the resulting binary image data therein is recombined in a stacking operation to produce the multiple-bit per pixel output. An alternative approach, also presented here is that the level slice filters could be applied in parallel and the outputs thereof combined by adding or stacking.

It is, therefore, apparent that there has been provided, in accordance with the present invention, a method and apparatus for producing a 1-to-N bit per pixel enhancement of a binary bitmap image, and more particularly to the use of template matching stack filters to produce such enhancements. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of transforming a plurality of rasterized binary signals indicative of a binary input image into a multiple-bit per pixel gray scale image, comprising the steps of:

(a) receiving the plurality of rasterized binary signals;

(b) filtering the rasterized binary signals to produce a binary level slice from each one of a plurality of level-slice filters; and (c) combining the binary level slices to produce the multiple-bit per pixel gray scale image.

2. The method of claim 1, wherein the step of filtering the rasterized binary signals, comprises the steps of:

(a) passing the binary input image through a first level-slice filter to generate a first level slice image comprised of a plurality of primary binary output signals; and (b) passing the first level slice through a second level-slice filter to generate a second level slice image comprised of a plurality of secondary output signals.

3. The method of claim 2, wherein the step of passing the binary input image through a first level-slice filter, comprises:

(a) storing a plurality of rasterized binary signals in a buffer memory until at least sufficient context is available to operate the first level-slice filter;

(b) identifying those binary signals in the buffer memory that are within a filter window for a pixel location;

(c) generating, as a function of the binary signals in the filter window for the pixel location, a primary binary output signal for the corresponding pixel location in the first level slice;

(d) repeating steps (b) and (c) for each possible pixel location in the buffer memory;

(e) replacing at least a portion of the binary signals stored in the buffer memory with rasterized binary signals from an unfiltered portion of the binary input image;

and (f) repeating steps (b) through (e) until all of the rasterized binary signals within the binary input image have been filtered.

4. The method of claim 3, wherein the step of generating a primary binary output signal for the corresponding pixel location, comprises:

(a) producing, as a function of the binary signals in the filter window for the pixel location, an index value;

(b) applying the index value to a look-up table of filter templates; and (c) outputting, from the look-up table, a primary binary output signal associated with the index value.

5. The method of claim 4, further comprising the step of logically combining the primary binary output signal with the corresponding binary signal in the filter window.

6. The method of claim 3, wherein the step of passing the first level slice through a second level-slice filter, comprises:

(a) storing primary binary signals in a second buffer memory until at least sufficient context is available to operate the second level-slice filter;

(b) identifying those primary binary signals in the buffer memory that are within a second filter window for a pixel location;

(c) generating, as a function of the primary binary signals in the second filter window for the pixel location, a secondary binary output signal for the corresponding pixel location in the first level slice;

(d) repeating steps (b) and (c) for each possible pixel location in the second buffer memory;

(e) replacing at least a portion of the binary signals stored in the buffer memory with rasterized binary signals from a remaining portion of the first level slice image; and (f) repeating steps (b) through (e) until all of the rasterized binary signals within the first level slice image have been filtered.

7. The method of claim 6, wherein the step of generating a secondary binary output signal for the corresponding pixel location, comprises:

(a) producing, as a function of the binary signals in the second filter window for the pixel location, a second index value;

(b) applying the second index value to a second look-up table of filter templates; and (c) outputting, from the second look-up table, a second binary output signal associated with the index value.

8. The method of claim 7, further comprising the step of logically combining the primary binary output signal with the corresponding binary signal in the filter window.

9. The method of claim 3, wherein the step of generating a primary binary output signal includes applying a first morphological filter to the binary signals in the filter window for the pixel location, to produce the primary binary output signal for the corresponding pixel location in the first level slice.

10. The method of claim 6, wherein the step of generating a secondary binary output signal includes applying a second morphological filter to the binary signals in the second filter window for the pixel location, to produce the secondary binary output signal for the corresponding pixel location in the second level slice.

11. A method of transforming a binary input image $B(x,y)$, represented as a plurality of rasterized binary signals, into a multiple-bit per pixel gray scale: image comprising the steps of:

(a) storing the binary input image $B(x,y)$ in a first memory $M(x,y)$;

(b) filtering the binary image stored in the first memory $M(x,y)$ to produce a filtered binary image $F_1(x,y)$;

(c) storing the filtered binary input image $F_1(x,y)$ in the first memory $M(x,y)$;

(d) filtering the binary image stored in the first memory $M(x,y)$ to produce a new filtered binary image $F_n(x,y)$; and (e) stacking filtered binary image $F_1(x,y)$ and new filtered binary image $F_n(x,y)$ to produce a gray-scale output image $O(x,y)$, wherein each of a plurality of pixels therein is represented as a two-bit value.

12. The method of claim 11, wherein the step of filtering the binary image stored in the first memory $M(x,y)$ to produce a filtered binary image $F_1(x,y)$, comprises:

(a) producing, as a function of the binary image signals stored in the first memory $M(x,y)$, a plurality of index values $i(x,y)$;

(b) applying each of the index values $i(x,y)$ to a look-up table of filter templates; and (c) outputting from the look-up table, in response to the index values $i(x,y)$ a plurality of binary output signal associated with the index values, wherein the plurality of binary output signals form the filtered binary image $F_1(x,y)$.

13. The method of claim 12, wherein the step of filtering the binary image stored in the first memory $M(x,y)$ to produce a new filtered binary image $F_n(x,y)$, comprises:

(a) producing, as a function of the binary image signals stored in the first memory $M(x,y)$, a plurality of index values $j(x,y)$;

(b) applying each of the index values $j(x,y)$ to a second look-up table of filter templates; and (c) outputting from the second look-up table, in response to the index values $j(x,y)$ a plurality of binary output signal associated with the index values, wherein the plurality of binary output signals form the filtered binary image $F_n(x,y)$.

14. A method for transforming a binary input image $B(x,y)$ into a multiple-bit per pixel gray-scale image comprising the steps of:

(a) storing the binary input image $B(x,y)$ in a first memory $M(x,y)$;

(b) filtering the binary image stored in the first memory $M(x,y)$ to produce a filtered binary image $F_1(x,y)$;

(c) storing the filtered binary input image $F_1(x,y)$ in the first memory $M(x,y)$;

(d) filtering the binary image stored in the first memory $M(x,y)$ to produce a new filtered binary image $F_n(x,y)$;

(e) stacking filtered binary image $F_1(x,y)$ and new filtered binary image $F_n(x,y)$ to produce interim image $I(x,y)$, and storing the interim image in a second memory;

(f) storing the new filtered binary input image $F_n(x,y)$ in the first memory $M(x,y)$;

(g) filtering the binary image stored in the first memory $M(x,y)$ to produce a new filtered binary image $F_n(x,y)$;

(h) stacking interim image $I(x,y)$ and new filtered binary image $F_n(x,y)$ to produce a new interim image $I(x,y)$, and storing the interim image in a second memory; and (i) repeating steps (f) through (h) above for a plurality of times to produce a gray-scale output image $O(x,y)$, wherein each of a plurality of pixels therein is represented as a multiple-bit value.

15. A digital image filtering apparatus, comprising:

a first memory for storing a binary input image;

a first level-slice filter to which the stored binary image may be applied, said first level-slice filter producing a primary binary signal in response to each pixel of the binary image applied thereto to produce a first image slice filter output;

combination logic for logically combining the first slice filter output and the binary input image to produce a first level slice image;

a second level-slice flitter to which the first filtered image may be applied, said second level-slice filter producing a secondary binary signal in response to each pixel of the first level-slice image applied thereto to produce a second slice filter output;

combination logic for logically combining the second slice filter output and the first image slice to produce a second level-slice image; and stacking logic for logically stacking the second image slice and the first image slice to produce a filtered image that is a multiple-bit per pixel image representing each of a plurality of binary pixels within the binary input image as a two-bit value.

16. The digital image filtering apparatus of claim 15, wherein the first and second level-slice filters each comprise look-up tables, responsive to a plurality of binary signals applied thereto, to produce a binary output signal.

17. The digital image filtering apparatus of claim 15, wherein the first and second level-slice filters are anti-extensive filters.

18. The digital image filtering apparatus of claim 15, wherein the first and second level-slice filters are extensive filters.

19. A digital image filtering apparatus, comprising:

a first memory for storing a binary input image;

an extensive level-slice filter to which the stored binary image may be applied, said first level-slice filter producing a first binary signal in response to each pixel of the stored binary image applied thereto to produce a first level slice image;

an anti-extensive level-slice filter to which the stored binary image may be applied, said second level-slice filter producing a second binary signal in response to each pixel of the stored binary image applied thereto to produce a second level slice image; and stacking logic for logically stacking the second image slice and the first image slice to produce a filtered image that is a multiple-bit per pixel image representing each of a plurality of binary pixels within the binary input image as a two-bit value.

20. The apparatus of claim 19, wherein the extensive level-slice filter further includes combination logic for logically combining the first binary signal and the associated binary input image signal to produce the first level slice image.

21. The apparatus of claim 20, wherein the anti-extensive level-slice filter further includes combination logic for logically combining the second binary signal and the associated binary input image signal to produce the second level slice image.

22. A digital image filtering apparatus for transforming a binary input image represented as a plurality of rasterized binary signals each representing an image pixel, into a multiple-bit per pixel gray scale image, comprising:

a primary level-slice filter for filtering the binary input image to produce a first filtered binary image;

a first secondary level-slice filter for filtering the first filtered binary image to produce a second filtered binary image;

a second secondary level-slice filters for filtering the first filtered binary image to produce a third filtered binary image; and an adder for adding the first filtered binary image, the second filtered binary image, and the third filtered binary image to produce a gray-scale output image, wherein each of a plurality of pixels therein is represented as a multiple-bit value.

23. The digital image filtering apparatus of claim 22, wherein the primary and secondary level-slice filters each comprise look-up tables, responsive to a plurality of binary signals applied thereto, to produce a binary output signal.

24. A digital image filtering apparatus for transforming a binary input image represented as a plurality of rasterized binary signals, each representing an image pixel, into a multiple-bit per pixel gray scale image, comprising:

a first level-slice filter to which the binary input image may be applied, said first level-slice filter producing a first binary signal in response to each pixel of the binary image applied thereto to produce a first image slice;

a second level-slice filter to which the binary input image may be applied, said second level-slice filter producing a secondary binary signal in response to each pixel of the binary image applied thereto to produce a second image slice; and means for combining the second image slice and the first image slice to produce a filtered image that is a multiple-bit per pixel image representing each of a plurality of pixels within the input image as a multiple-bit value.

25. The digital image filtering apparatus of claim 24, wherein said means for combining the second image slice and the first image slice comprises an adder.

26. The digital image filtering apparatus of claim 24, wherein said means for combining the second image slice and the first image slice comprises a stacker.

27. The digital image filtering apparatus of claim 24, wherein the first and second level-slice filters each comprise look-up tables, responsive to a plurality of binary signals applied thereto, to produce a binary output signal.

28. The digital image filtering apparatus of claim 24, wherein the first and second level-slice filters comprise anti-extensive filters.

29. The digital image filtering apparatus of claim 24, wherein the first and second level-slice filters comprise extensive filters.

30. The digital image filtering apparatus of claim 24, wherein the first level-slice filter comprises an extensive filter and the second level-slice filter comprises an anti-extensive filters.

* * * * *